United States Patent [19]
Pagdin et al.

[11] Patent Number: 4,545,345
[45] Date of Patent: Oct. 8, 1985

[54] AIR/FUEL INDUCTION SYSTEM FOR A MULTI-CYLINDER INTERNAL COMBUSTION ENGINE

[75] Inventors: Brian C. Pagdin; David J. Marriage, both of Dunstable, England

[73] Assignee: Solex (U.K.) Limited, London, England

[21] Appl. No.: 555,406

[22] Filed: Nov. 28, 1983

[30] Foreign Application Priority Data

Dec. 1, 1982 [GB] United Kingdom ............... 8234310
Dec. 13, 1982 [GB] United Kingdom ............... 8235448

[51] Int. Cl.$^4$ ............................................. F02B 3/00
[52] U.S. Cl. ............................. 123/299; 123/527; 123/448; 123/478
[58] Field of Search ............ 123/448, 478, 299, 300, 123/489, 527

[56] References Cited

U.S. PATENT DOCUMENTS

| | | | |
|---|---|---|---|
| 3,780,711 | 12/1973 | Lindberg | 123/448 |
| 3,971,348 | 7/1976 | Scofield | 123/490 |
| 4,002,152 | 1/1977 | Hoshi | 123/299 |
| 4,167,925 | 9/1979 | Hosaka et al. | 123/489 |
| 4,168,679 | 9/1979 | Ikeura et al. | 123/489 |
| 4,204,507 | 5/1980 | Casey et al. | 123/478 |
| 4,226,215 | 10/1980 | Kobayashi et al. | 123/487 |
| 4,407,251 | 10/1983 | Nakanishi | 123/299 |
| 4,421,087 | 12/1983 | Schuurman | 123/478 |
| 4,430,978 | 2/1984 | Lewis et al. | 123/478 |

FOREIGN PATENT DOCUMENTS

| | | |
|---|---|---|
| 0034076 | 1/1981 | European Pat. Off. . |
| 2370216 | 11/1976 | France . |
| WO80/00033 | 7/1979 | PCT Int'l Appl. ............... 123/527 |

Primary Examiner—E. Rollins Cross
Attorney, Agent, or Firm—Parkhurst & Oliff

[57] ABSTRACT

An air/fuel induction system includes a pair of solenoid valves injecting fuel into an induction passage of a multi-cylinder engine. The valves supply fuel upstream of the inlet manifold to the engine and do not therefore direct fuel to specific cylinders. The solenoids (36, 36a) operate alternatively through pulses developed by drive units controlled by a microprocessor-based control unit (19). Each valve is independently timed by a respective timer-counter (44, 45) and valve operation overlaps in some circumstances. This allows smaller valves to be used and overcomes the problem of gusting at low speeds. The system may be applied to an LPG fuel system used as an additional fuel supply.

6 Claims, 7 Drawing Figures

4,545,345

AIR/FUEL INDUCTION SYSTEM FOR A MULTI-CYLINDER INTERNAL COMBUSTION ENGINE

BACKGROUND AND SUMMARY OF THE INVENTION

This invention relates to an air/fuel induction system for a multi-cylinder internal combustion engine and to electronic control apparatus for controlling fuel supply to the engine. In particular it relates to an internal combustion engine having a plurality of fuel supply valves feeding an air/fuel induction passage, wherein the quantity of fuel delivered by said valves at each opening is determined by the period of said opening, and which period is controlled by the width of a fuel pulse signal developed by the electronic control apparatus.

The description filed with the present Applicant's co-pending application Ser. No. 555,481 filed Nov. 28, 1983 relates to a dual fuel system for an internal combustion engine, enabling a driver of a vehicle to select as fuel either petrol or liquefied petroleum gas. The LPG system incorporates a pair of fuel injection valves which are operated alternately. The present invention may be applied to such a system or to other fuel systems in which fuel is delivered into an air/fuel induction passage, prior to the inlet manifold, via a plurality of valves.

Multiple valve, multipoint fuel injection systems are well known. In these systems fuel is injected directly into a cylinder of the engine by a respective injector valve on each cylinder. It has been proposed to allow the operating periods of the injector valves to overlap. For example EP A No. 0034076 discloses a multipoint injection system wherein 6 injector valves are provided, each injecting directly into an associated cylinder of the engine. The disclosed system allows the operation of the two of the injector valves to overlap by a small amount at high engine speeds. It will be appreciated however that during an overlap period when two cylinders are simultaneously being supplied with fuel, this fuel is directed separately and independently into the two cylinders and there is no question of one cylinder receiving fuel designated for another cylinder.

By contrast, the present invention is concerned solely with injection of fuel into an air/fuel induction passage which is common to a plurality of cylinders.

In single valve systems the valve, operating in synchronism with cylinder firings, may be required to operate in a frequency range of 20–200 Hz. Such valves are expensive. In an LPG system the valves are also required to have large outlet orifices; this makes it difficult to operate efficiently at high frequencies, and also tends to cause the fuel to be supplied in undesirable large gusts at low frequencies. Dual or multi-valve systems with alternate operation allow the operating frequency range of individual valves to be smaller.

The valves may still have to have the same capacity as the valve in the single valve system in order to be capable of supplying enough fuel at high engine speeds. Thus the gusting of the fuel at low frequencies will still occur. An object of the present invention is to alleviate these difficulties.

According to the present invention there is provided an air/fuel induction system for a multi-cylinder internal combustion engine comprising an air/fuel induction passage, a driver-operable throttle valve for controlling the flow of air/fuel mixture to cylinders of the engine, fuel injection means operative to deliver metered pulsed outputs of fuel to a location in the induction passage, upstream of the inlet manifold, and electronic control means operative to produce electrical signals to control the duration of each pulse output of fuel from the fuel injection means, wherein the fuel injection means comprises at least two injector valves operated sequentially under control of said electronic control means, such that the commencement of a pulse output of fuel is synchronised with the operation of the engine, and such that under predetermined engine operating conditions the opening periods of at least two of said valves overlap.

The invention also provides an electronic control apparatus for the air/fuel injection system as aforesaid, the control apparatus being adapted to receive signals representing engine operating parameters, and including signal processing means, which on the basis of the values of said received signals, produces an output signal representing a value for controlling the duration of a pulse output of fuel from the fuel injection means, the apparatus further including means for feeding pulse width signals representing said output signals sequentially to said injector valves, each pulse width signal being fed independently to an injector valve such that an injector valve may receive a pulse width signal while another injector valve is also receiving a pulse width signal.

In one example the means for feeding pulse width signals representing said output signals comprises independent timers associated with respective injector valves, each timer receiving sequentially a control signal from said signal processing means to determine its timing period and being operative to produce a pulse width signal, whose duration is determined by its timing period, for transmission to control the associated injector valve.

BRIEF DESCRIPTION OF THE DRAWINGS

Embodiments of the invention will now be described, by way of example only, with reference to the accompanying drawings.

In the drawings.

DETAILED DESCRIPTION OF THE PREFERRED EMBODIMENTS

Figure 1:
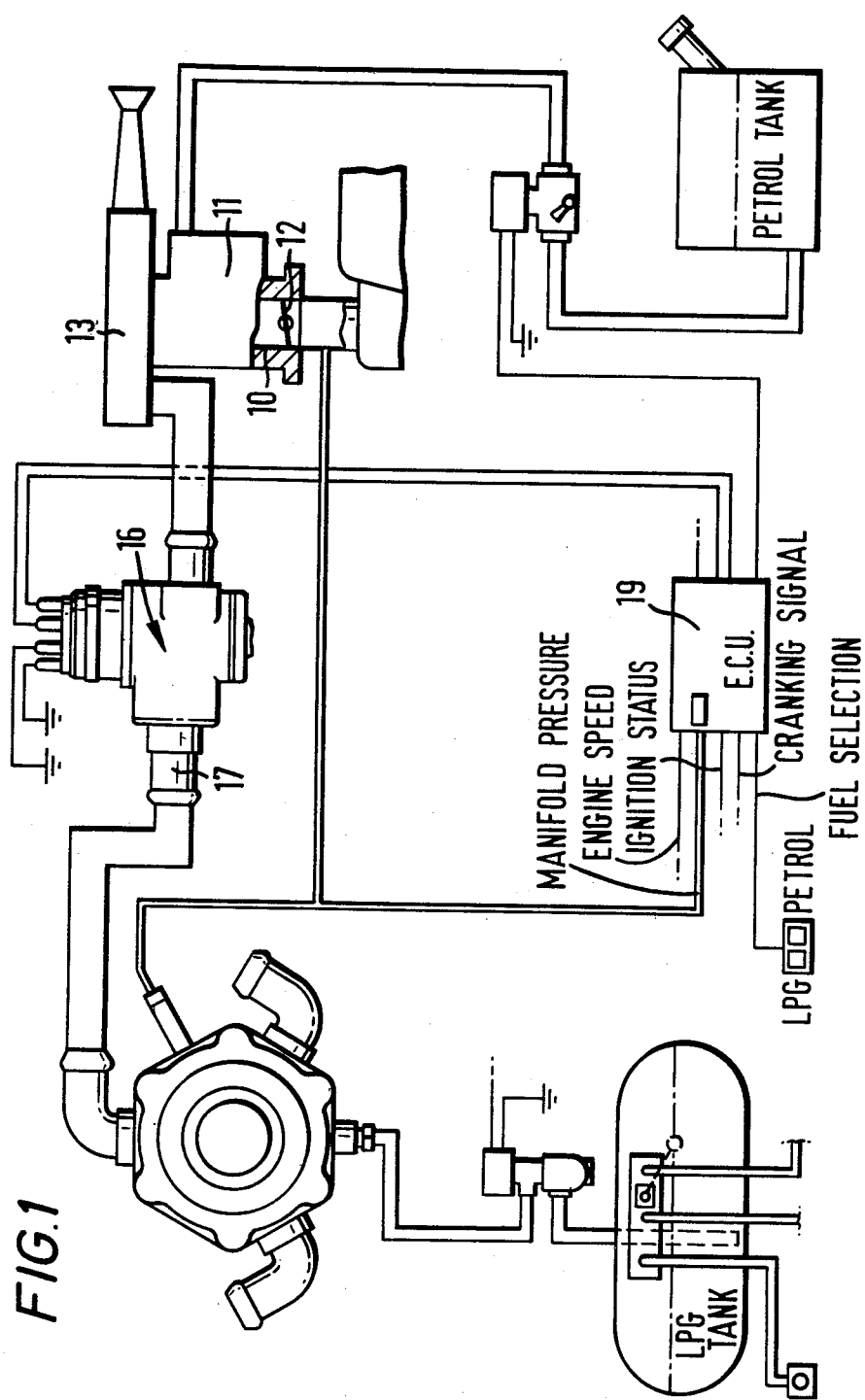
FIG. 1 is a schematic diagram of a petrol/LPG fuel system for a four cylinder engine which incorporates two gaseous LPG injection valves.

FIG. 1 shows a dual fuel supply system for an internal combustion engine of a vehicle; the fuel supply systems being respectively for petrol and gaseous liquid petroleum gas (LPG) either of which may be selected by the driver of the vehicle. The description filed with U.S. patent application Ser. No. 555,481 in the name of Solex (U.K.) Limited contains a detailed description of this system. The system is adapted to supply metered quantities of either petrol or gaseous LPG to an induction passage 10 of a carburetor 11 upstream of a driver-operable throttle valve 12. The fuel is supplied into the induction passage for mixture with air drawn into the induction passage via an air cleaner 13 by the operation of a multi-cylinder internal combustion engine to which the carburetor is fitted. The carburetor induction passage 10 is in communication with the inlet manifold of the engine so that the air fuel mixture controlled by the throttle valve 12 is distributed to the cylinders of the engine.

The present invention concerns a fuel supply system in which fuel is supplied using a plurality of supply valves, and, in the present example, this comprises a dual injection valve assembly controlling fuel supply in the LPG system.

The dual valve injector assembly 16 of the LPG system has a common inlet 17 to which gaseous LPG at a regulated superatmospheric pressure is fed and communicates with the carburetor induction passage 10 through the air cleaner 13. An electronic control unit 19 produces fuel supply pulses to the drive circuits of the valve assembly 16 to control the opening of the valves and hence the quantity of fuel supplied upon each injection.

Figure 2:
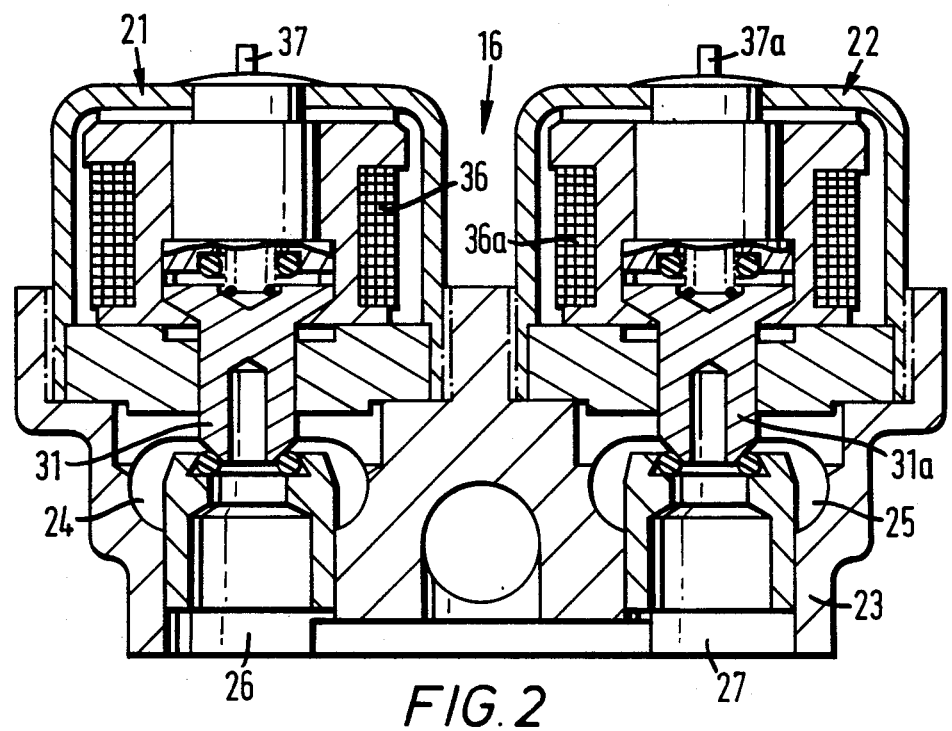
FIG. 2 is a sectional view of an assembly of two plunger-type fuel injector valves for use in the system shown in FIG. 1.

FIG. 2 shows the injector valve assembly 16 in detail; it comprises two electromagnetic injector valves 21 and 22 mounted side by side in a common body 23. Each injector valve 21 and 22 controls communication between a respective one of two branch inlet passages 24 and 25 and a respective outlet passage 26, 27; the two branch inlet passages 24 and 25 leading from the common inlet 17. The two output passages 26 and 27 both lead to the air induction passage of the engine. Each valve includes a sliding plunger 31, 31a whose motion is controlled by a co-axial solenoid winding 36, 36a such that energization of the solenoid winding lifts the plunger 31, 31a, and the corresponding inlet passage 24, 25 of the valve then communicates with the respective outlet passage 26, 27. A quantity of gaseous fuel, determined by the duration of the energization of the solenoid, is allowed to flow through the valve passage and into the respective outlet passage 26 or 27 to the air induction passage. A coil spring 33 reseats the plunger 31 at the termination of the energization current to the solenoid.

It should be understood that the valve has two operating conditions in which it is either open or closed so that the quantity of fuel delivered is solely determined by the length of time for which the valve is opened, which in turn is determined by the duration of the energization current from the solenoid drive circuit. Each valve is capable of delivering LPG gas at a rate of 15 kg/hr which is appropriate to an engine having a power output of 100 kW.

The electronic control unit 19 develops fuel metering pulses which are fed to the solenoid drive circuits. The width of each fuel metering pulse determines the duration of the drive pulse from the solenoid drive circuit and the amount of fuel delivered in an injection. The duration of the fuel metering pulses developed by the electronic control unit are computed on the basis of a number of engine-operating parameters, and these are used to interrogate matrices or look-up tables in a memory in the electronic control unit under the control of a microprocessor. The matrices or look-up tables store data giving values for the appropriate fuel metering pulse width. The electronic control unit is substantially similar to that described in the Applicants' co-pending application in relation to a single point fuel injection system. The main parameters used to compute the value of the fuel metering pulse width are engine speed and a function of engine loading. In the present example the function of engine loading is absolute manifold pressure sensed by a pressure transducer mounted within the control unit and communicating with the inlet manifold by a length of tubing.

Engine speed is computed from a signal derived from the vehicle ignition circuit, for example, from the four vane switch of a Hall-effect distributor. After suitable pulse shaping a train of pulses—'ignition pulse signals' derived from the ignition pulses is fed to the microprocessor unit.

Figure 3:
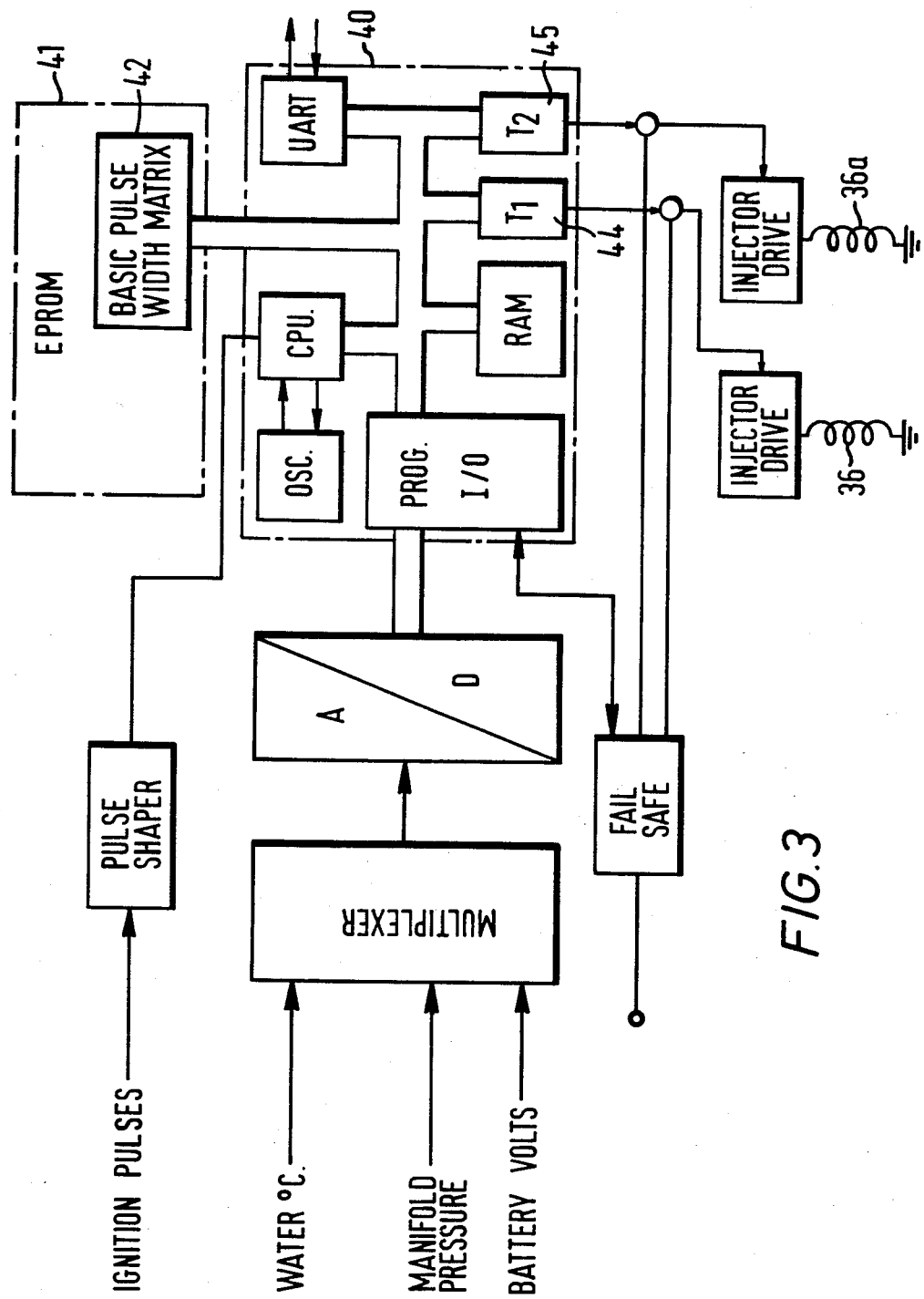
FIG. 3 is a block schematic diagram of an electronic control unit used with the system.

Referring now to FIG. 3 the electronic control unit comprises an INTEL 8031 microprocessor 40 with an erasable programmable read-only memory 41. The EPROM 41 includes a basic pulse width matrix 42 addressed by the signals representing engine speed and inlet manifold pressure.

Successive values for the fuel metering pulses obtained from the memory matrix are loaded by the processor alternately into one of two timer counters 44 and 45 to set their timing periods. The commencement of timing of each of the timers is set by alternate ones of the ignition pulse signals, derived from the ignition circuit of the engine. It will be assumed herein that the setting of the timer counters is commenced at the beginning of each ignition signal, although in other examples a delay may be introduced between the ignition pulse signals and commencement of timing.

Each timer counter produces an output signal when set by an ignition pulse signal and then counts successive clock pulses until this count reaches the number set by the matrices and look-up tables in the memory unit. At the end of the timing period the timer is reset and its output is discontinued. The output pulse from each timer counter is produced at a respective output terminal of the counter unit for the duration of the timing period of the timer. Each output terminal is connected to a respective one of the solenoid drive circuits of the corresponding one of the two injector valves. Since the timers are set by alternate ones of the ignition pulse signals each valve is opened upon alternate cylinder firings.

Figure 4:
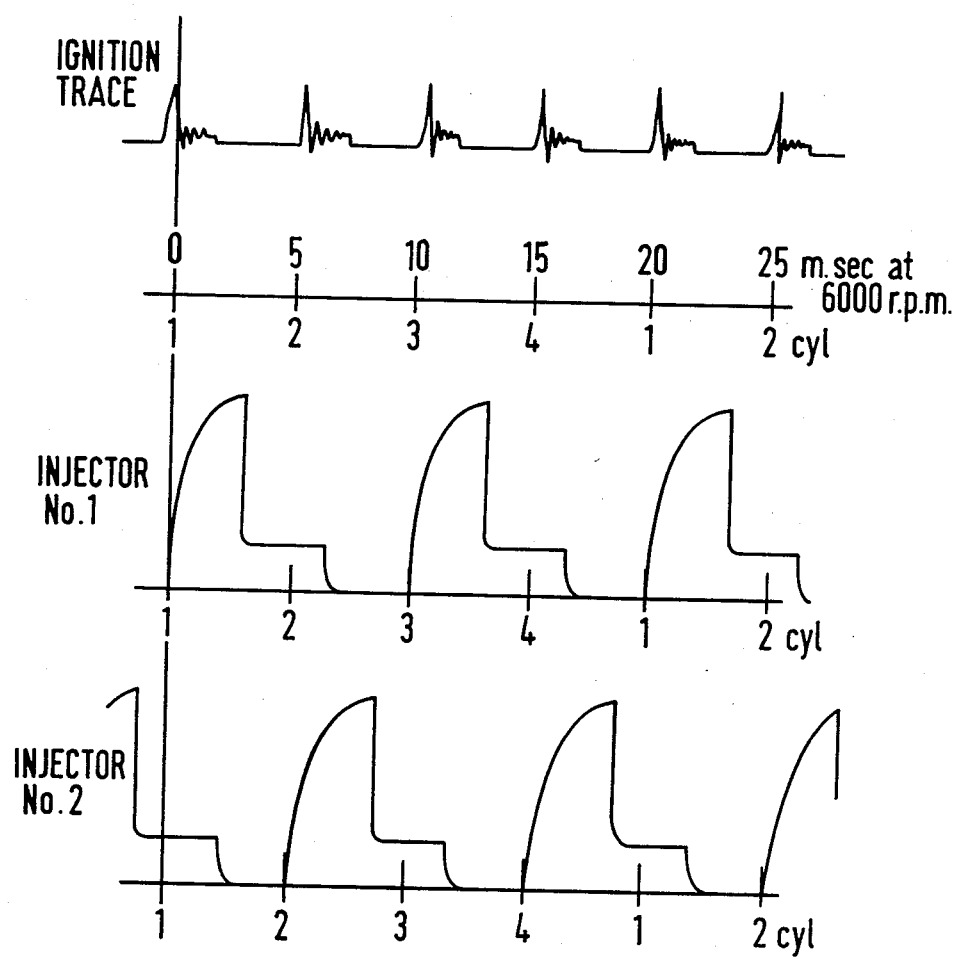
FIG. 4 is a graph illustrating operation of the two injector valves of the system shown in FIG. 1 in relation to the ignition firing sequence of the engine.

FIG. 4 shows the timing diagram of the pulses from the solenoid drive circuits in relation to ignition signals at 200 Hz. The solenoid pulses are generated by waveform shapers controlled by the pulse signals from the control unit, and have leasing edges leading to a drive current of approximately 4 amps which is effective to displace the valve piston from its seat, followed by a steady portion of approximately 1 amp during which the valve piston is held in its open position.

Although the output pulses from each of the timers 44 and 45 cause the valves to open alternately at equivalent points in the engine cycle on alternate cylinder firings, one valve may remain open beyond the time of opening of the other. This is shown clearly in FIG. 4 where it will be seen that the duration of the solenoid pulses overlap at an engine speed of 6000 RPM.

Figure 5:
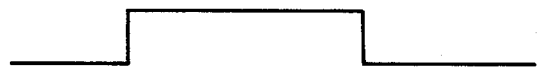
FIGS. 5a, 5b, and 5c are an illustrative diagram of the effect on fuel delivery of the injection valves.
Figure 5:
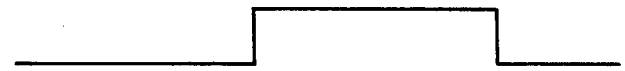
Figure 5:
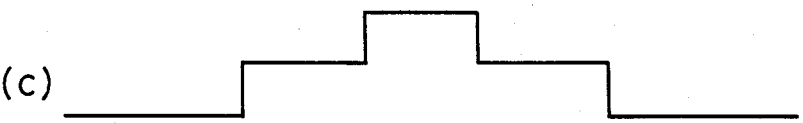

It will be appreciated that during overlap operation the rate of fuel delivery is greater than the constant value which occurs during non-overlap operation. This is shown in FIG. 5 where the composite effect of the valves is shown in part (c) beneath the fuel outputs of the individual valves (a) and (b). In this way greater fuel control, creating a virtual analogue effect, is achieved.

We claim:

1. An air/fuel induction system for a multi-cylinder internal combustion engine comprising an air/fuel induction passage, a driver-operable throttle valve for controlling the flow of air/fuel mixture to cylinders of the engine, fuel injection means operative to deliver metered pulsed outputs of said fuel in a gaseous state directed to a location in the induction passage upstream of the inlet manifold, and electronic control means operative to produce electrical signals to control the duration of each pulsed output of fuel from the fuel injection means, the fuel injection means comprising at least two injector valves operated sequentially under control of said electronic control means, such that the commencement of a pulsed output of fuel is synchronized with the operation of the engine, and such that under predetermined engine operating conditions the opening periods of at least two of said valves overlap.

2. An air/fuel induction system as claimed in claim 1 characterised in that the fuel is liquefied petroleum gas.

3. Electronic control apparatus for the air/fuel induction system as claimed in claim 1, the electronic control means being adapted to receive signals representing engine operating parameters, and including signal processing means, which on the basis of the values of said received signals, produces an output signal representing a value for controlling the duration of a pulse output of fuel from the fuel injection means, the apparatus further including means for feeding pulse width signals representing said output signals sequentially to said injector valves, each pulse width signal being fed independently to an injector valve such that the injector or valve may receive a pulse width signal while another injector valve is also receiving a pulse width signal.

4. Electronic control apparatus as claimed in claim 3 characterised in that the means for feeding pulse width signals representing said output signals comprises independent timers associated with respective injector valves, each timer receiving sequentially a control signal from said signal processing means to determine its timing period and being operative to produce a pulse width signal, whose duration is determined by its timing period, for transmission to control the associated injector valve.

5. Electronic control apparatus as claimed in claim 4 characterised in that the output signal from the signal processing means is a digital signal and said timers are counters arranged to count to the value of said digital signal.

6. Electronic control apparatus as claimed in claim 4 wherein the commencement of timing of the timers is successive and is synchronized with successive cylinder firings.

* * * * *